United States Patent [19]

Allocco, Jr.

[11] 4,019,370
[45] Apr. 26, 1977

[54] LEAK TESTING DEVICE AND METHOD FOR PLASTIC BOTTLES

[75] Inventor: Andrew Allocco, Jr., Miami, Fla.

[73] Assignee: Farm Stores, Inc., Miami, Fla.

[22] Filed: Oct. 24, 1975

[21] Appl. No.: 625,772

[52] U.S. Cl. .................................. 73/45.1; 73/49.2
[51] Int. Cl.² .......................................... G01M 3/32
[58] Field of Search ............. 73/37, 45, 45.1, 49.2, 73/45.3

[56] References Cited

UNITED STATES PATENTS

| | | | |
|---|---|---|---|
| 3,489,275 | 1/1970 | Powers, Jr. | 73/37 X |
| 3,683,676 | 8/1972 | Hass | 73/45.1 |
| 3,683,677 | 8/1972 | Harris | 73/49.2 |
| 3,762,213 | 10/1973 | Nowicki | 73/45.3 |
| 3,785,195 | 1/1974 | Yasuhiro et al. | 73/37 |
| 3,805,593 | 4/1974 | Sandoz et al. | 73/49.2 |
| 3,879,987 | 4/1975 | Yasuhiro et al. | 73/37 |
| 3,894,424 | 7/1975 | Taylor et al. | 73/49.2 |

Primary Examiner—Richard C. Queisser
Assistant Examiner—Joseph W. Roskos
Attorney, Agent, or Firm—Morgan, Finnegan, Pine, Foley & Lee

[57] ABSTRACT

Plastic bottles from a molding machine are transported on a conveyor through a leak testing device where a predetermined number are temporarily stopped in register with overhead reciprocable test heads and with lateral ejectors on one side of the conveyor path. The bottles are supported on the opposite side by a movable side gate which, when a defective bottle is to be ejected, is moved to a clearance position. The test heads are lowered into air tight communication with the mouths of the bottles and a constant volume of pressurized air is discharged into each bottle from a reservoir. The resultant pressure of the bottle-reservoir system is an index of bottle integrity.

15 Claims, 7 Drawing Figures

LEAK TESTING DEVICE AND METHOD FOR PLASTIC BOTTLES

BACKGROUND

In the fabrication of lightweight plastic bottles, e.g., high density polyethylene bottles in half and 1 gallon dairy types, problems are frequently encountered by the presence of pin holes, cuts, tears, weaknesses or malformities in the container structure. The exact cause of the fault may be any one or a combination of causes including malfunction of the blow molding machine and contamination of the resin used to fabricate the bottles.

If a faulty container were filled with a liquid product, such as milk, then the product would be lost. This results in higher production costs cased upon the value of the product lost, the value of the operating time lost in filling the faulty container; and the value of polymer used in fabricating the bottle.

In recognition of these problems, lightweight containers are generally tested for integrity prior to their filling with product. Unfortunately, the testing devices presently available are generally of a differential pressure type designed for testing high strength containers, such as glass bottles or cans, and are not suitable for lightweight plastic because they deform the plastic bottle and provide inaccurate and unreliable test results.

SUMMARY OF THE INVENTION

The present invention relates to a testing method and device particularly useful in the testing of lightweight plastic bottles.

The bottles are discharged from a molding machine preferably in discrete sets, e.g., four bottles at a time, on to a linear conveyor. The bottles are carried by the conveyor into the testing device where their movement is stopped by a retractable gate. An overhead test head is lowered into sealing engagement with the mouth of each bottle.

The test technique utilizes a constant volume reservoir whch is charged to a given pressure, preferably 60 psig. After each test head has sealed with a bottle mouth, the bottle is placed in communication with the reservoir to establish a new constant volume system, the bottle reservoir volume system. If no leaks are present in the bottle, the equilibrium pressure of the new system is at a predetermined value, preferably 1.0 to 2.0 psig.

The equilibrium pressure is sensed and compared to the set point values. If the pressure is below the set point value, a bottle ejection cycle is commenced, whereby the test head or heads is/are raised and a lateral ejector(s) is/are actuated to knock the defective bottle(s) off the conveyor. The remaining bottles on the conveyor are then carried further for processing on the conveyor.

DETAILED DESCRIPTION OF THE PREFERRED EMBODIMENT

Figure 1:
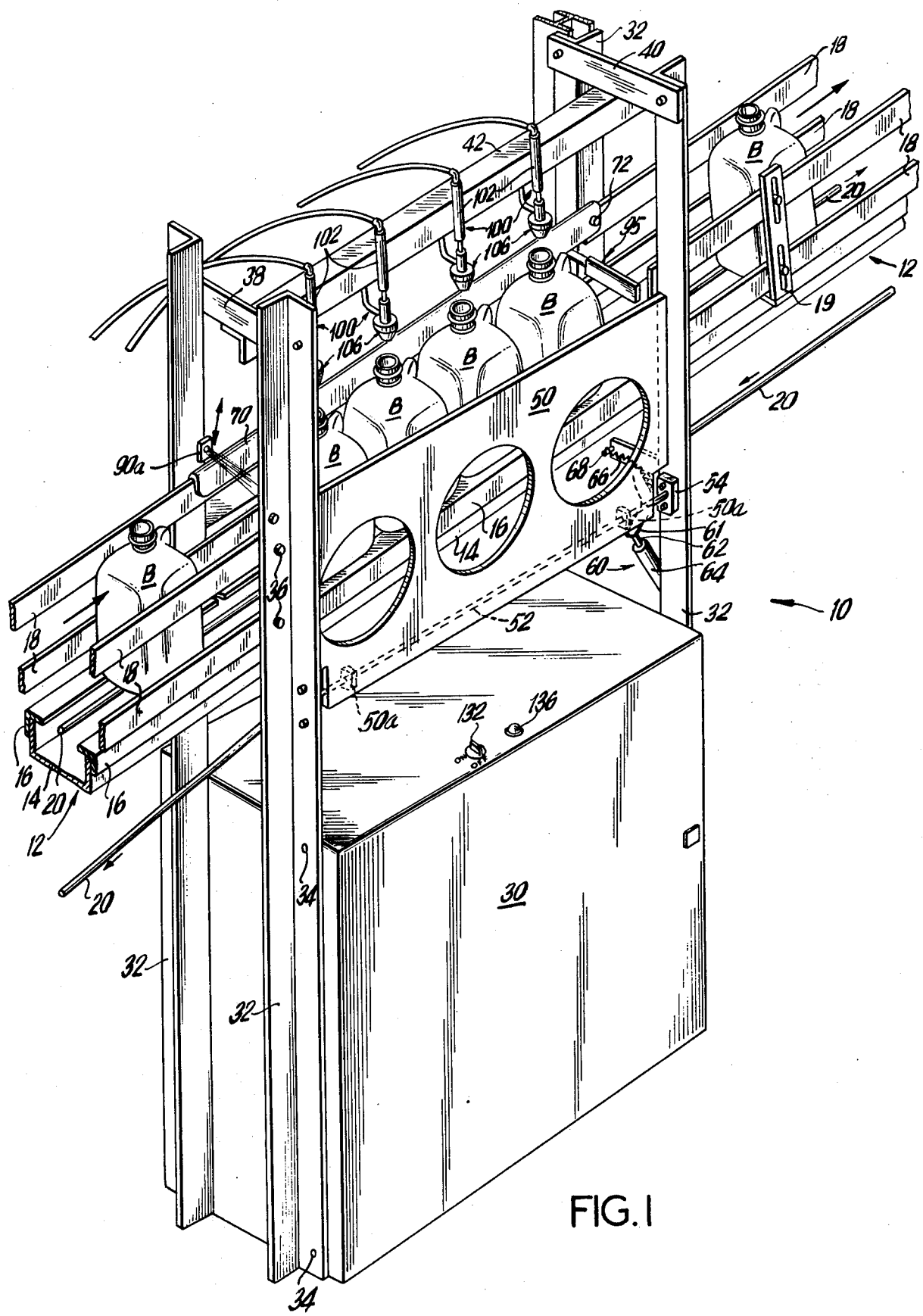
FIG. 1 is a perspective view of a leak detector apparatus of the present invention illustrating the apparatus in a conveyor carrying plastic bottles from a blow molding device.

While this invention is susceptible of embodiment in many different forms, there is shown in the drawings and will hereinafter be described in detail a preferred embodiment of the invention and modifications thereto, with the understanding that the present disclosure is to be considered as an exemplification of the principles of the invention and is not intended to limit the invention to the embodiments illustrated.

CONVEYOR

FIG. 1 illustrates the testing device 10 of the present invention incorporated in a conveyor 12 which transports lightweight plastic bottles B, such a high density polyethylene bottles, from a molding machine not shown. Conveyor 12 transports the bottles in an upright orientation from left to right, as indicated. Conveyor 12 is inclined upwardly from left to right and includes a longitudinally extending, upwardly facing generally U-shaped base 14 which mounts a pair of opposed angle members 16 at the free end of the base legs. The upper surfaces of members 16 slidably support the bottom of the bottles. The sides of the bottles are supported laterally by opposite pairs of lateral guide members 18; and each pair of guide members are vertically interconnected by spaced adjustment brackets 19, which are mounted on base 14.

Bottles B are transported on conveyor 10 by means of a continuously moving endless loop 20. Loop 20 at its upper reach is located centrally between angle members 16 at the elevation of the bottom of the bottles. In this manner, loop 20 frictionally engages the bottom of the bottles and transports them along the conveyor. It will be appreciated that, since loop 20 transports the bottles by frictional engagement, when a bottle is prevented from moving, loop 20 will nonetheless continue to move. Loop 20 is driven by suitable means, not shown, and is supported along its upper reach by pulleys also not shown. The lower reach of loop 20 returns beneath the conveyor.

TESTING DEVICE STRUCTURE

Figure 3:
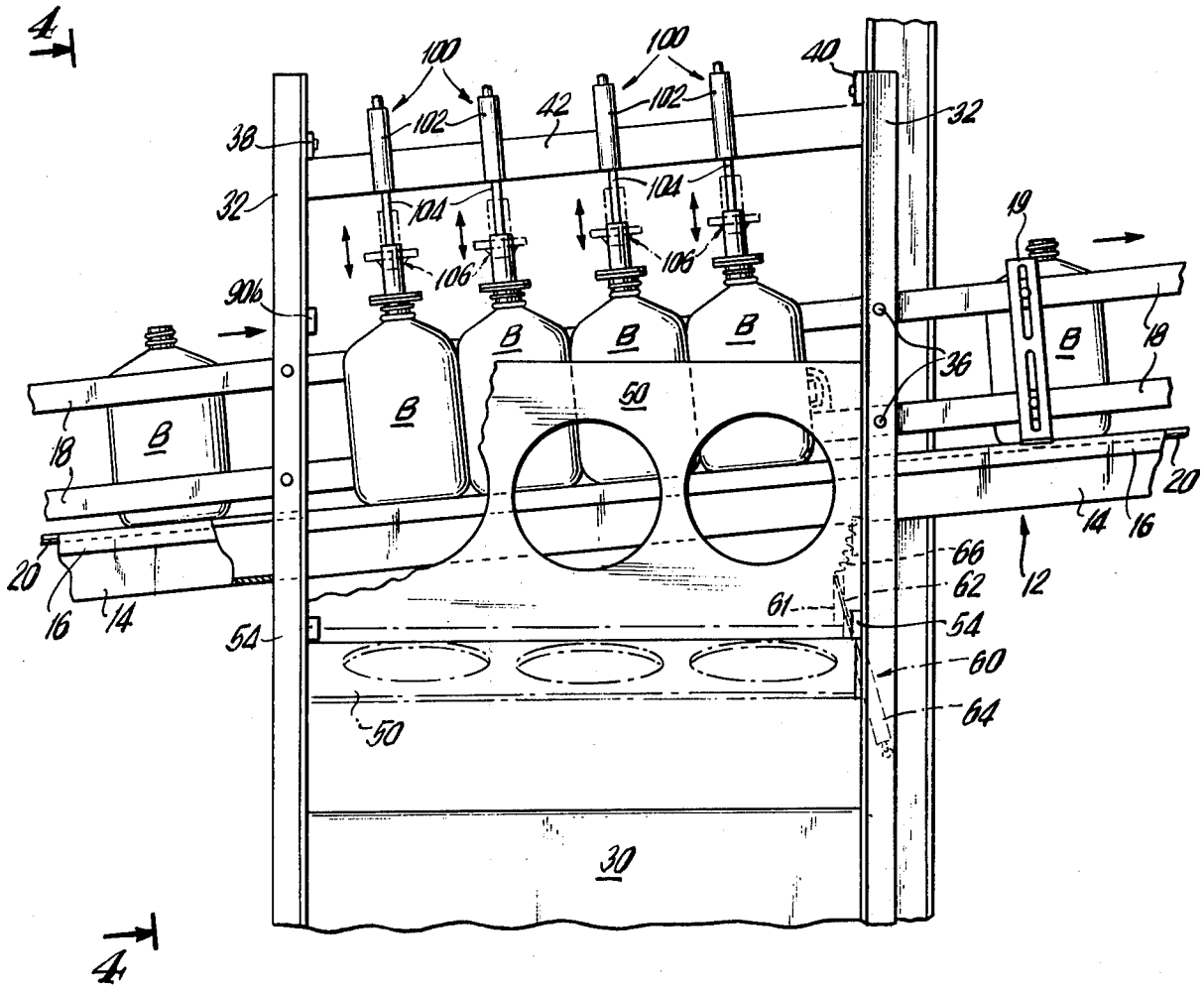
FIG. 3 is a fragmentary front elvation view illustrating the testing heads in the lowered position.

Testing device 10 includes a pneumatic-electrical control box 30 positioned beneath conveyor 12. Four angle supports 32 are secured to the sides of box 30 by fasteners 34 and extend upwardly beyond the elevation of top guides 18. Each support 30 is spaced outwardly from the outer surface of adjacent guides 18 and is secured thereto by fasteners 36. The upstream and downstream pairs of supports are interconnected by cross members 38 and 40, respectively. These cross members are, in turn, interconnected by a central longitudinal weldment brace 42, which also mounts a plurality of longitudinally spaced apart test head assemblies 100, described below, to define a plurality of test stations. With particular reference to FIG. 3, upstream cross member 38 is positioned at a lower elevation than downstream cross member 40 so that brace 42 is at an angle to the horizontal and is positioned in parallel relationship with the base of conveyor 12. In this manner, test head assemblies 50 are perpendicular to brace 42 and thus perpendicular to the conveyor and the mouths of bottles B.

SIDE GATES AND GUIDES

As best illustrated in FIGS. 1 and 3, the guides 18 at the front of the testing device terminate at the upright supports 32. In their place is a movable side gate 50 of generally rectangular shape which extends between the supports. Gate 50 includes a pair of brackets 50a at its lower end, as viewed in FIG. 1. A rod 52, which is fixedly mounted in pads 54 on each front support 32, extends through bores in brackets 50a to rotatably mount gate 50 to supports 32.

Figure 4:
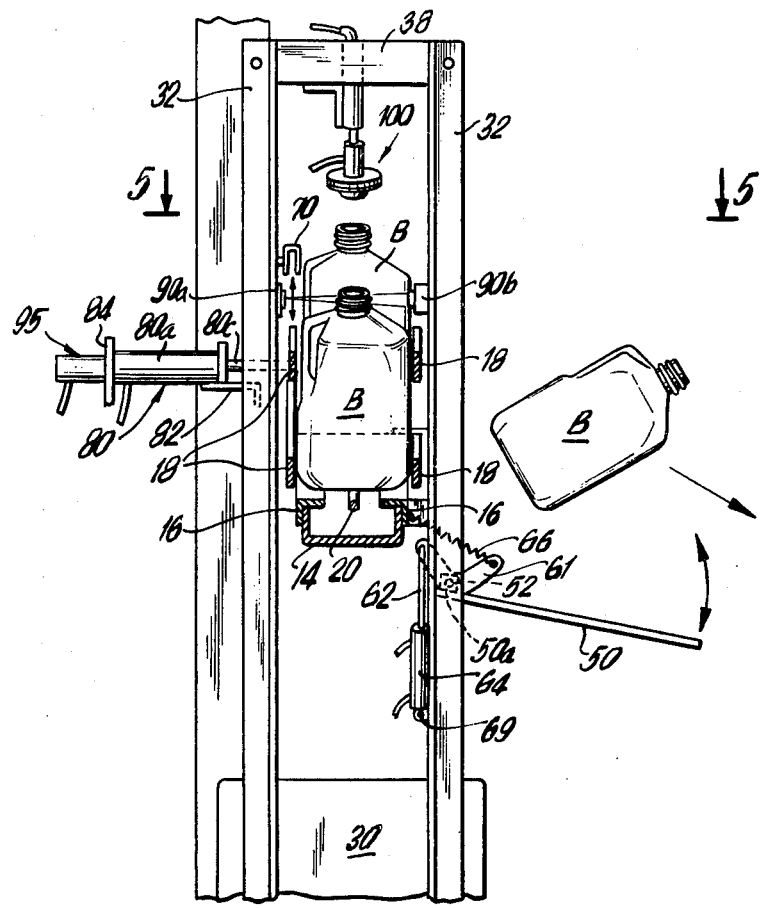
FIG. 4 is a cross-sectional view taken generally along line 4—4 in FIG. 3 illustrating bottle ejection.
Figure 5:
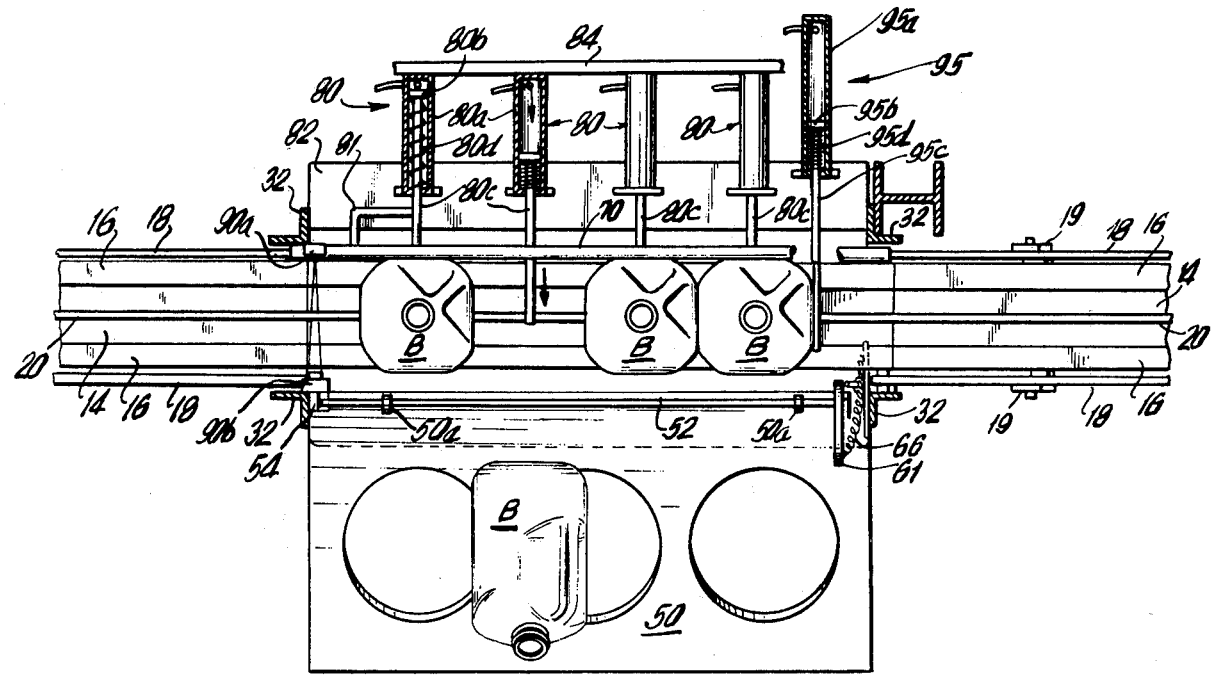
FIG. 5 is a cross-sectional view taken generally along line 5—5 in FIG. 4.

Gate 50 is movable from a guide or closed position, FIG. 1, to a bottle discharge or opened position, FIG. 5, by an air cylinder operated bell crank assembly 60 or other suitable pivoting device, such as a pneumatic rotary actuator. With reference to FIGS. 1 and 4, assembly 60 includes a bell crank 61 secured at its apex to gate 50. One crank arm is pivotally attached to the end of a piston rod 62 which extends from air cylinder 64. The other crank arm is attached to one end of a tension spring 66. Spring 66 is, in turn, attached at its opposite end to a frame mounted pin 68. Air cylinder 64 is pivotally mounted to support 32 by pin and bracket assembly 69 and is a double action type, i.e., the piston and rod are air driven for expulsion and retraction. The throw of rod 62 is sufficient to move bell crank 61 through an arc of about 100° so that gate 50 may be moved from the closed to the open position and back again. The gate is held in the closed position by the locking action of the double action piston.

With particular reference to FIGS. 1 and 4, the rear guides 18 are also modified within the testing device. More specifically, the top guide terminates at the supports 32 and is replaced with a vertically pivotal guide 70. Guide 70 is an elongated, downwardly face U-shaped cross-sectional member which is pivotally attached to downstream support 32 by pin 72. The upstream end of guide 70 bridges the upper guide 18, FIG. 1, to form a continuous side guide therewith. Guide 70 may be manually pivoted to gain access to the conveyor area with device 10 as illustrated in FIG. 4. The lower rear guide 18 extends through the testing device.

BOTTLE ASSEMBLY

Bottle testing is initiated when a predetermined number of bottles, e.g., four, are located in the conveyor within the testing device. To this end a photoelectric sensor system 90 including a light transmitter 90a and receiver 90b are positioned on supports 32 at the upstream end. The sensor system is located at the level of the path of the bottle neck so that as a bottle is conveyed thereby into the testing device, the light path is interrupted and a counting signal is generated to trigger the test cycle, described below.

Figure 2:
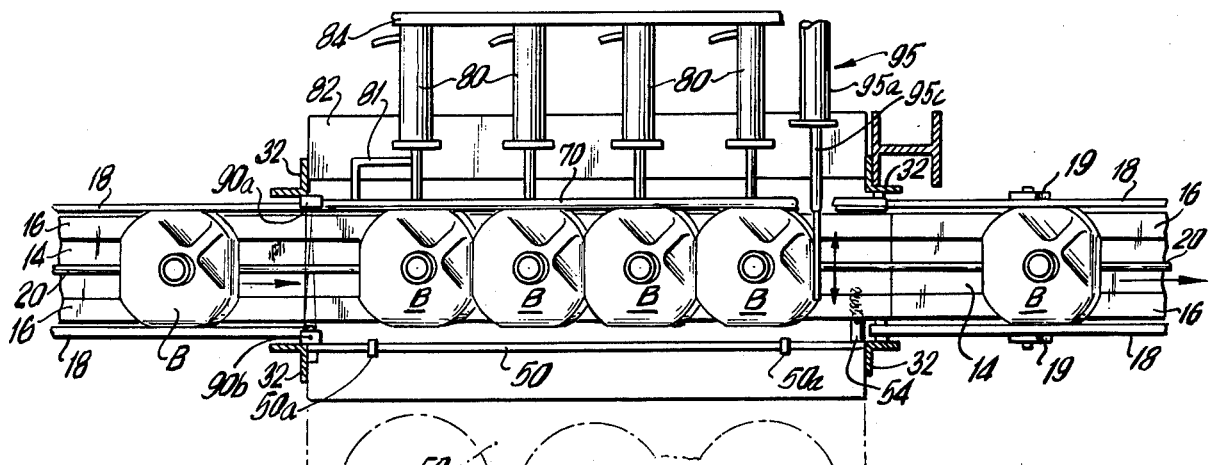
FIG. 2 is a top plan view of the apparatus.

The bottles B are retained on conveyor 12 within the test device by a reciprocal gate assembly 95, FIGS. 2 and 5. Assembly 95 includes an air cylinder 95a mounted on plate 82 transversely to the conveyor path at the downstream end of the testing device. A piston 95b is reciprocally mounted in cylinder 95a and carries a piston rod 95c which is moved from a retracted or clearance position to an extended or bottle blocking position, FIG. 5, when pressurized air is supplied to cylinder 95a. Piston 95b is normally biased to the retracted position by compression spring 95d to return the piston to the retracted position when the high pressure side of piston 95b is vented.

Gate assembly 95 is positioned in accordance with the width of the bottles B, so that each bottle is retained in lateral register with its associated ejector 80, described below, and each bottle mouth is in axial vertical register with its test head assembly 100, also described below.

Gate assembly 95 is deactivated to release the bottles after testing and reactivated after the last bottle tested has left the test device. In one preferred embodiment, where the bottles are molded four at a time, so that discrete sets of four bottles are transported on conveyor 12, gate assembly 95 is actuated by the last bottle in the set interrupting the sensor system. It will be appreciated that where single bottles are formed; or where bottles are transported in somewhat random order on the conveyor gate assembly 95 may be actuated by a photo sensor and counter at the downstream end of the device so that only tested bottles are released, and the gate is normally closed to collect the random bottles with the device.

BOTTLE EJECTION

As will be described in greater detail below, faulty bottles are ejected from the conveyor after side gate 50 is opened. To achieve ejection to plurality of air cylinder operated ejectors 80 are mounted in longitudinal spaced apart relationship at the backside of the testing device. Ejectors 80 are mounted on a weldment plate 82 extending between the rear upstream and downstream supports 32.

Four ejectors, corresponding in number to the four bottles simultaneously tested in the device, are mounted on plate 82 transversely to and adjacent the path of the bottles and in register with the position of the bottles when they are held in place for testing by gate 95. The ejectors may also be interconnected by a second brace 84.

Each ejector 80 includes an air cylinder 80a, a reciprocal piston 80b having a piston rod 80c extending therefrom toward the conveyor path, and a compression spring 80b, normally bracing the piston to the retracted position. When a bottle B is to be ejected, side gate 50 is lowered and (after the associated test head is raised) pressurized air is supplied to the appropriate ejector to drive the piston rod to the extended position and into contact with the bottle, thereby knocking the bottle off the conveyor as illustrated in FIG. 5. After the entire test cycle is completed, the air supply to the ejector is terminated; the high pressure side of the cylinder is vented and the piston and piston rod are returned to the retracted position by compression spring 80d.

Where the upstream or last bottle is to be ejected, a fork 81 affixed to the upstream or last rod 80c prevents a new bottle from prematurely interrupting the light path and moving under the last test heat 106.

TEST HEADS

The plastic bottles B are tested by a constant volume-pressure technique. Basically, this technique involves the storing of pressurized air at constant temperature in a reservoir of constant volume, e.g. a cylinder 1.5 in. in diameter and 12 in. long charged to 60 psig. The bottles are checked for leakage by placing each bottle in fluid communication with the charged reservoir. Since the volume of the reservoir and bottle are known, the resultant pressure of the bottle-reservoir system at constant temperature is also known. This resultant or theoretical pressure is used as an index to check bottle integrity. If a bottle leaks, the system pressure will be less than the index and the bottle will be rejected. Preferably a resultant pressure of about 1.0 to 2.0 psig. is utilized.

The structure for carrying forth the pressure technique is best illustrated with reference to FIGS. 3 and 6. Each test head assembly 100 includes spring loaded air cylinder 102 from which a piston rod 104 extends to mount test head 106. Each head 106 includes a tubular body portion 106a terminating with an enlarged circular flange portion 106b which extends beyond the outer diameter of the bottle neck. Depending from flange portion 106b is a frusto-conical shaped centering element 106c. Element 106c is tapered off to fit within the mouth of a bottle B. A flow passage 106d extends generally axially from element 106c to the upper end of portion 106a and is in communication with air supply line 108. Line 108 supplies the control volume air to the bottles under test. To insure proper sealing between each head 106 and bottle, a resilient annular gasket 106e of a relatively soft elastomeric material is affixed to the underside of the enlarged flange 106b. As best illustrated in FIG. 6, the outer diameter of each gasket 106e is the same as the outer diameter in flange 106b.

Figure 6:
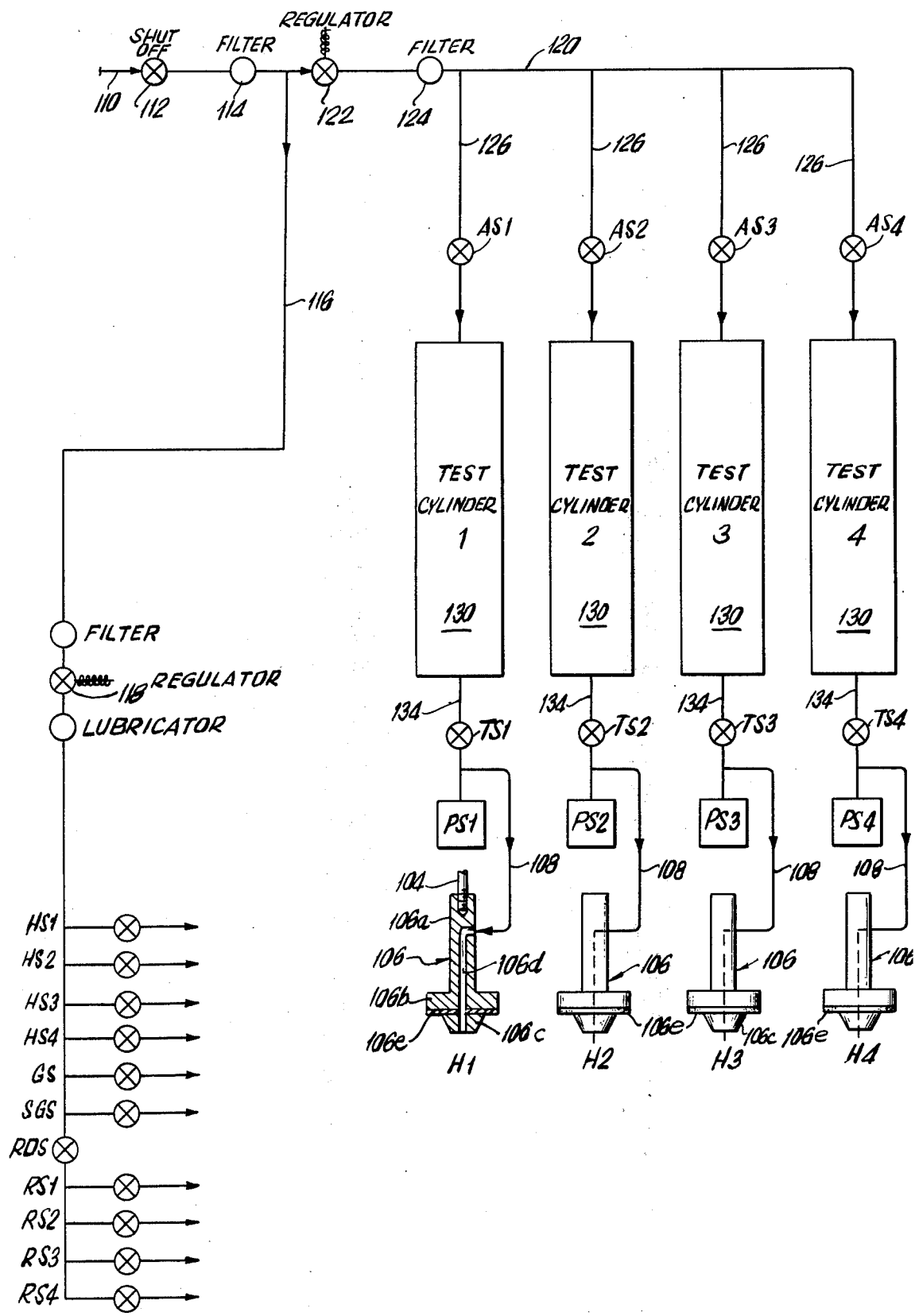
FIG. 6 is a schematic block diagram of a pneumtic control system suitable for use in the present invention.

Pneumatic air is supplied to test device with the system shown in FIG. 6. Specifically, pressurized air is supplied from a source, not shown, to trunk line 110, which includes shut-off valve 112 and filter 114. A first branch line 116 directs a portion of the control air through regulator 118 to the head assembly cylinders 102 through solenoid control valves HS1, HS2, HS3 and HS4; gate cylinder 95a through solenoid valve 6S; side gate cylinder 64 through dual action solenoid valve SGS; through reject control solenoid valve RDS to the ejector cylinders 80a through solenoid valves RS1, RS2, RS3 and RS4.

A second branch 120 directs control air through regulator 122 and filter 124 to parallel paths 126 for the pressure head leak test system. Each branch 126 supplies pressurized air to a control volume test cylinder 130 through a solenoid valve AS1, AS2, AS3 and AS4.

Each test cylinder has a discharge line 134 terminating with a test solenoid valve TS1, TS2, TS3 and TS4. During the charging of the test cylinders 130, valves AS1–AS4 are opened and valves TS1–TS4 are closed, as described below. The downstream side of each test solenoid valve is coupled to line 108 to supply test air to the bottles when the valves are opened. Finally, the test lines 108 each include a spring locked pressure sensing switch PS1, PS2, PS3 and PS4 which measure the reservoir (test cylinder)-bottle system pressure and compare it to a predetermined set value corresponding to the no leak pressure.

OPERATION

Figure 7:
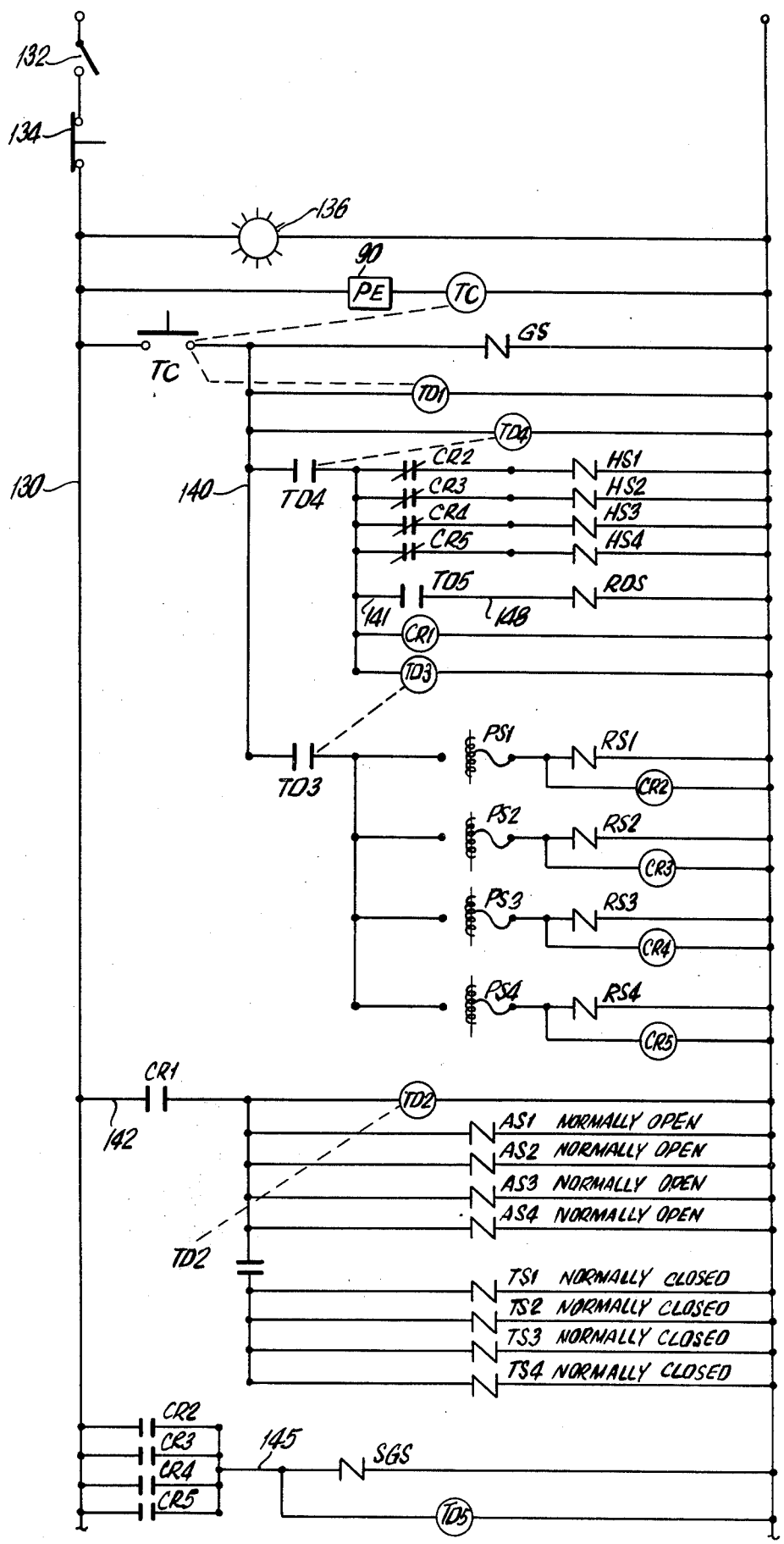
FIG. 7 is a schematic electrical diagram for the apparatus of this invention.

The operation of the testing device may be best explained with reference to FIGS. 6 and 7. FIG. 7 is the schematic electrical block diagram which controls the operation of the pneumatic system of FIG. 6.

Power is supplied from a source to main line 130, which includes an ON-OFF switch 132 (and manual reset button 134) in series, and a parallel pilot light 136.

As the bottles are conveyed past sensor system 90, a pulse is generated and counted by counter switch TC. After a fourth bottle has passed sensor 90, the illustrated test device is full and counter switch TC closes to supply power to bus 140, and thereby initial the system logic.

Bus 140 supplies power to stop gate solenoid GS to actuate gate assembly 95; main timer TD1, which sets the total test procedure elapsed time and resets the tester when timed out by resetting counter TC. Timer TD4 permits sufficient time for the stop gate assembly 95 to block the movement of bottles and position them in register in the test device and then closes its associated relay for time operation.

When switch delay TD4 is closed power is supplied to individual test head solenoid HS1, HS2, HS3 and HS4 through individual relays CR2, CR3, CR4 and CR5, respectively, which are in the closed position, to lower each test head 106 into engagement with the mouth of its associated bottle B.

Switch TD4 also supplies power to line 141, which is controlled by timing switch TD5, described below. Power is also supplied to activate circuit relay CR1 and time delay switch TD3. Relay CR1 controls line 142, and when activated it supplies electrical power to timing switch TD2 and air supply solenoids AS1, AS2, AS3 and AS4. Activation of the air supply solenoids, which are normally open, causes test cylinders 130 to be isolated from air supply lines 126 thereby establishing a control volume in the test cylinders 130. Timer TD3 allows sufficient time for the pressure to equalize in bottle and test cylinder before supplying electrical power to reject circuit through TD3 contacts line 140.

Timing switch TD2 permits sufficient time to elapse for isolating the test cylinders 130 and testing the bottles. When switch TD2 is activated, it closes to supply power and to open test solenoid valves TS1, TS2, TS3 and TS4. When these valves are opened, each test cylinder 130 is placed in communication with a bottle and a bottle-cylinder volume system is established. When timer TD1 times out, the test is completed and valves Ts1–TS4 are closed.

During the test period of switch TD4, timing switch TD3 supplies power to the individual pressure switches PS1, PS2, PS3 and PS4 which sense the equilibrium pressure in the respective bottle-test cylinder systems. If the equilibrium pressure which is reached in about one second in any bottle is below a set point corresponding to a no leak condition, the associated pressure switches supplies power to its associated ejector cylinder solenoid RS1, RS2, RS3 or RS4 to place the appropriate ejector cylinder in fluid communication with the supply line. Leaks may result from holes in the container or from malformed mouth and neck. The latter results when the two halves of the bottle structure are misaligned in the molding machine with the result that gasket 106e does not fully seal. Control air is not, however, at this time supplied to the ejector due to solenoid valve RDS which is in the closed position. Any or all of PS1–PS4, when activated, open an associated relay CR2, CR3, CR4 or CR5, respectively, controlling the test head of the bottle to be ejected thereby deactivating its solenoid valve HS1, HS2, HS3 or HS4 and raising the test head out of engagement with the bottle.

Secondly, closing another set of contacts in CR2, CR3, CR4 or CR5 energizes line 145. Line 145, in turn, operates side gate solenoid SGS to cause the side gate 50 to be lowered to the clearance position, see FIG. 4, and energizes timing switch TD5. Switch TD5 is set to allow the side gate to be lowered, when time delay switch times out it closes to connect line 148 to line 141 thereby energizing solenoid valve RDS. When solenoid valve RDS is energized it opens, thus permitting control air to charge the ejector solenoids RS1, RS2, RS3 and RS4 and operate the ejector assembly or assemblies 80 associated with the leaking bottle determined by PS1–PS4.

After the bottle or bottles have been ejected, timer TD1 times out and resets TC which operates relays CR2–CR5, which in turn closes valve RDS and SGS, raising the side gate. Timer TD3 then resets de-energizing its circuit; followed by timer TD4 resulting in a completion of testing, resetting of all pneumatic valves and release of the tested bottles from the test device. The system is then ready for a new set of four bottles which are summoned by counter TC1.

Typically, each test cycle as controlled by TD1 for the embodiment of the invention heretofore described can be completed in about 6 to 10 seconds.

These and other modifications may be made by those skilled in the art without departing from the scope and spirit of the present invention as pointed out in the appended claims.

What is claimed is:

1. Apparatus for leak testing lightweight plastic bottles comprising:
   a. a plurality of test stations each having a retractable head;
   b. conveyor means for transporting said bottles through said test stations;
   c. means at said test stations for sensing the entrance of bottles into said test stations and generating a command signal when a set of bottles have entered the test station;
   d. movable means at the downstream end of said test stations for preventing the exit of said bottles until completion of testing and aligning the bottle mouths in register with said head in response to said command signal;
   e. means for moving each of said heads into and out of sealing engagement with its associated bottle leak test means at each test station including:
      i. reservoir means for receiving and containing a given volume of pressurized fluid from a source,
      ii. control means responsive to said command signal for segregating said reservoir means from said source and placing said reservoir in communication with its associated head, whereby a test pressure-volume relationship is established between the reservoir and bottle, and
      iii. means for sensing the pressure of said test pressure-volume relationship and comparing said sensed pressure to a set point value; and
   f. ejector means operatively connected to said comparing means for displacing the associated bottle if said sensed pressure is below said set point value.

2. Apparatus of claim 1, wherein said conveyor means is a linear conveyor.

3. Apparatus of claim 2, wherein said linear conveyor is inclined upwardly toward the downstream end.

4. Apparatus of claim 1, further comprising a side gate located on the side opposite said ejector means, means movably mounting said side gate for movement between a guide position adjacent the path of the bottles on the conveyor and a clearance position remote from the path of the bottles, wherein bottles may pass over the side gate; and means operatively coupled to said comparing means for moving said side gate to said clearance position prior to the operation of any of said ejector means.

5. Method for leaking resting lightweight plastic bottles comprising:
   a. transporting a single row of a plurality of lightweight bottles serially in an upright orientation along a linear path through a plurality of test stations;
   b. sensing the entrance of bottles into said test stations and generating a command signal when a set of bottles have entered the test stations;
   c. temporarily stopping a bottle at each test station on said path in response to the command signal;
   d. reciprocating a test head from each test station into sealing relationships with the mouths of said bottles;
   e. charging a plurality of constant volume reservoirs to a predetermined pressure with a fluid;
   f. placing each of said bottles in communication with one said reservoir through its associated test head to establish a bottle-reservoir volume system;
   g. sensing the pressure of each of said systems and comparing it with a given pressure corresponding to a no leak system pressure;
   h. automatically ejecting each of said bottles from a test station whose system pressure is below said given pressure by ejecting means which are responsive to the comparing means; and
   i. releasing the remaining bottles on said path for continued movement therealong.

6. The method of claim 5, wherein said given system pressure is in the range of about 1.0 to 2.0 p.s.i.g.

7. The method of claim 5, wherein said ejecting step is performed by striking the side of the bottle laterally of said path to knock the bottle from said path.

8. The method of claim 5, wherein the operation of each of steps (c) – (f) is performed simultaneously on the bottles at the test site.

9. Apparatus for leak testing lightweight plastic bottles comprising:
   a. a plurality of test stations each having a retractable head;
   b. conveyor means for transporting said bottles through said test stations;
   c. means at the upstream end of said test station for sensing the entrance of bottles into said test stations and generating a command signal when a set of bottles have entered the test station;
   d. retractable gate means at the downstream end of said test stations for temporarily preventing the exit of said bottles and aligning the bottle mouths in register with said head in response to said command signal;
   e. means for moving each of said heads into and out of sealing engagement with its associated bottle leak test means at each test station including:
      i. reservoir means for receiving and containing a given volume of pressurized fluid from a source,
      ii. control means responsive to said command signal for segregating said reservoir means from said source and placing said reservoir in communication with its associated head, whereby a test pressure-volume relationship is established between the reservoir and bottle, and iii. means for sensing the pressure of said test pressure-volume relationship and comparing said sensed pressure to a set point value;

f. lateral ejector means operatively connected to said comparing means for displacing the associated bottle if said sensed pressure is below said set point value; and g. means operatively connected to said test stations and said retractable gate means for retraction of said gate means when the testing is complete whereupon said conveying means transports said tested bottles from said testing stations and transports untested bottles to said testing stations.

10. Apparatus of claim 9, further comprising a side gate located on the side opposite said ejector means; means pivotally mounted said side gate for movement between a guide position adjacent the path of the bottles on the conveyor and a clearance position remote from the path of the bottles, wherein bottles may pass over the side gate; and means operatively coupled to said comprising means for moving said side gate to said clearance position prior to the operation of any of said ejector means.

11. Apparatus of claim 10, further comprising a side gate located on the side of said ejector means, and means for moving said gate to allow access to the conveyor area within said test stations.

12. Apparatus of claim 9, wherein said sensing means at the upstream end of said testing stations are photoelectric sensor systems.

13. Apparatus of claim 9, wherein there are four such testing stations which test four lightweight plastic bottles at a time.

14. Apparatus of claim 9, wherein said conveyor means is a continuously movable linear conveyor loop which frictionally engages said bottles for transportation thereof.

15. Apparatus for leak testing lightweight plastic bottles of claim 14, wherein said conveyors transport said bottles from a molding machine which forms the bottles, to, through and from said test stations for further processing on said conveyor.

* * * * *